United States Patent
Cloutier et al.

(10) Patent No.: US 7,006,609 B2
(45) Date of Patent: Feb. 28, 2006

(54) SYSTEM FOR THE REMOTE NOTIFICATION AND RETRIEVAL OF ELECTRONICALLY STORED MESSAGES

(75) Inventors: Jocelyn Cloutier, Menlo Park, CA (US); Allen E. Milewski, Red Bank, NJ (US); David Millen, Fair Haven, NJ (US)

(73) Assignee: AT&T Corp., New York, NY (US)

( * ) Notice: Subject to any disclaimer, the term of this patent is extended or adjusted under 35 U.S.C. 154(b) by 467 days.

(21) Appl. No.: 10/298,314

(22) Filed: Nov. 15, 2002

(65) Prior Publication Data

US 2003/0095642 A1 May 22, 2003

Related U.S. Application Data

(63) Continuation of application No. 09/222,908, filed on Dec. 30, 1998, now Pat. No. 6,535,586.

(51) Int. Cl.
*H04M 1/64* (2006.01)

(52) U.S. Cl. .................................. 379/88.23; 379/88.12
(58) Field of Classification Search ... 379/88.12–88.15, 379/88.16, 88.17, 88.23, 88.19, 88.22, 88.27, 379/88.28; 455/413; 340/7.1, 7.22, 7.23, 340/7.49, 7.52; 380/247–250, 257, 260, 270, 380/271, 273, 27, 777–796, 28–30; 709/200, 709/204

See application file for complete search history.

(56) References Cited

U.S. PATENT DOCUMENTS

| 5,647,002 | A | * | 7/1997 | Brunson | 709/206 |
| 5,742,905 | A |   | 4/1998 | Pepe et al. | |
| 5,768,526 | A | * | 6/1998 | Fawcett | 709/229 |
| 5,781,614 | A | * | 7/1998 | Brunson | 379/88.14 |
| 5,978,837 | A |   | 11/1999 | Foladare et al. | |
| 6,006,087 | A | * | 12/1999 | Amin | 455/413 |
| 6,122,485 | A | * | 9/2000 | Archer | 340/7.22 |
| 6,298,231 | B1 | * | 10/2001 | Heinz | 455/413 |
| 6,333,973 | B1 | * | 12/2001 | Smith et al. | 379/88.12 |
| 6,335,963 | B1 | * | 1/2002 | Bosco | 379/88.12 |
| 6,535,586 | B1 | * | 3/2003 | Cloutier et al. | 379/88.13 |
| 2001/0043677 | A1 | * | 11/2001 | Takeda et al. | 379/67.1 |

* cited by examiner

*Primary Examiner*—Roland G. Foster (57) ABSTRACT

The present invention provides a method and system to generate a unique code for a message and then allows easy and direct access to the content of that specific message. The unique code is transmitted in a message alert, which may be implemented for a variety of media. In particular, according to one embodiment, the present invention provides a method and system for enhanced messaging services incorporating the capability of alerting a message service subscriber to the receipt of high priority messages according to a defined set of filter criteria. The present invention is highly flexible and can be designed to work with any type of electronic message including e-mail, voice mail, facsimile etc. Furthermore, the enhanced messaging services are transparent to the typical messaging services in use today so that subscribers are not required to change messaging services or learn a new system.

9 Claims, 5 Drawing Sheets

SYSTEM FOR THE REMOTE NOTIFICATION AND RETRIEVAL OF ELECTRONICALLY STORED MESSAGES

CROSS-REFERENCE TO RELATED APPLICATION

This is a continuation of U.S. patent application Ser. No. 09/222,908 filed Dec. 30, 1998 now U.S. Pat. No. 6,535,586.

FIELD OF THE INVENTION

The present invention relates generally to communication networks. In particular, the present invention is directed to a mobile messaging system and comprises a method and apparatus for direct access to messages circumventing the complexity of complex voice menus.

BACKGROUND OF THE INVENTION

Reliance upon messaging services for personal and business use has grown significantly in recent years. The average business or home user relies upon a diverse set of voice mail, e-mail and FAX services. However, the user interface in many messaging systems is often deficient. In addition, messaging systems generally do not provide an integrated and flexible environment for the retrieval and manipulation of diverse message types. For example, a typical user maintains separate services for voice mail and e-mail and is forced to learn and use a different command set for each service. Moreover, the command structure for a typical messaging service such as voice-mail often requires the user to navigate a complex menu structure. Mastering this command structure is often time consuming and confusing and because of this difficulty, most users do not take advantage of many of the features of the system. In addition, the complexity of learning and operating many messaging systems and the lack of real time messaging involving synchronous communication often results in user's decision to avoid using the service at all. For example, it is estimated that many e-mail subscribers fail to check their e-mail accounts on a regular basis. The majority of the current generation of consumer e-mail services require a user to switch on their personal computer, start a program to initiate a dial-up connection with their e-mail server and then navigate a complex set of menus and commands to read each e-mail, respond or perform other functions. Although most e-mail systems in the work place do not require dial-up access, often the message recipient is away from the computer terminal, and therefore may miss important time-sensitive messages.

The lack of an instant or direct notification upon the receipt of a message is a significant shortcoming of many messaging systems. Although the availability of "paging" services provide some means for high priority message transfer, these services have limited capability in the size of transmitted messages. Typically, paging services provide the capacity to alert a subscriber of a paging party's telephone number only. Furthermore, conventional messaging systems do not provide any filtering mechanism so that a user is only alerted upon the receipt of high priority messages. For example, an e-mail user might desire instant notification when an e-mail message is received from a particular sender or concerning a particular subject.

In addition, message system subscribers often need the capability for the retrieval of messages remotely. For example, often mobile users do not have access to a personal computer or other device necessary to access e-mail messages. A user might be traveling or otherwise unable to gain access to a personal computer or the Internet. For example, a user at home might need the capability of being alerted to the receipt of important e-mail messages on their work e-mail server.

Thus, a need exists for a system through which an electronic message recipient can be quickly notified of the receipt of a message according to a selected set of criteria even while the recipient is away from a computer terminal or other device typically used for the retrieval of messages. Furthermore, there is a need for a complementary system through which a user can retrieve an electronic message remotely, even though the intended recipient does not have access to a personal computer or other conventional retrieval apparatus.

SUMMARY OF THE INVENTION

The present invention provides a method and system to generate a unique code for a message and then allows easy and direct access to the content of that specific message. The unique code is transmitted in a message alert, which may be implemented for a variety of media.

In particular, according to one embodiment, the present invention provides a method and system for enhanced messaging services incorporating the capabilities of alerting a message service subscriber to the receipt of high priority messages according to a defined set of filter criteria and the remote retrieval of messages. The present invention is highly flexible and could be designed to work with any type of electronic message including e-mail, voice mail, FAX etc. Furthermore, the enhanced messaging services are transparent to the typical messaging services in use today so that subscribers are not required to change messaging services or learn a new system.

According to one embodiment of the present invention, the enhanced messaging system continually monitors the receipt of new messages for a subscriber. Using a predefined set of filter criteria, the messaging service screens lower priority messages. Upon receipt of one or more high priority messages meeting the pre-defined filter criteria, the enhanced messaging system generates a unique message code and transmits this code to the enhanced message subscriber using any number of real time delivery devices such as a pager, computer connected over a network such as the Internet, a PCS (Personal Communication Services) phone with SMS messages, etc. The message recipient may then remotely retrieve the message by establishing communications with the enhanced messaging system either by telephone or other communication media and transmitting the previously received message code. According to one embodiment of the present invention, the enhanced messaging system provides for translation of messaging formats (e.g., text to speech) so that a user can retrieve virtually any type of message over any type of communication medium.

DETAILED DESCRIPTION:

The present invention is compatible with a myriad of electronic message formats. The embodiments discussed herein relate to the e-mail message format in particular. However, the depiction of enhanced e-mail services is merely illustrative and is not intended to limit the scope of the claims appended hereto. The present invention is compatible with a myriad of alternative message media including voice mail and FAX.

Furthermore, the embodiments described herein pertain to the transmission and retrieval of messages over the Internet. However, the present invention could be used to provide enhanced messaging services for messages retrieved from any number of alternative networks such as an intranet, local area network (LAN), metropolitan area network (MAN), wide area network (WAN) or even a wireless network, and thus, the embodiments discussed herein are not intended to limit the scope of the claims appended hereto.

Figure 1:
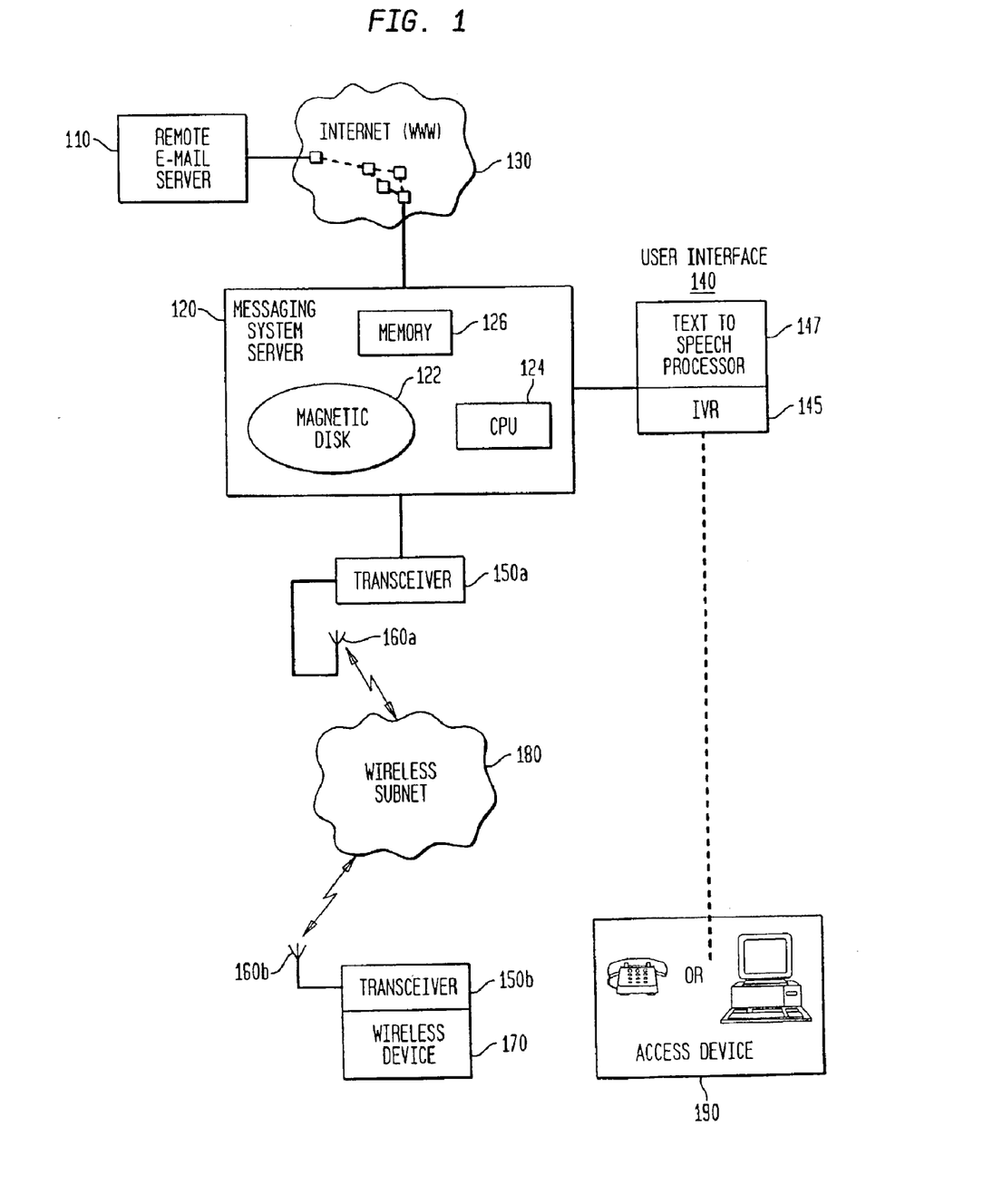
FIG. 1 is a block diagram depicting system architecture for providing enhanced messaging services according to one embodiment of the present invention.

FIG. 1 is a block diagram depicting a system architecture for enhanced messaging services for e-mail subscribers according to one embodiment of the present invention. The enhanced messaging functions provided by the present invention comprise two major components: (1) notification of the enhanced message service subscriber of the receipt of high-priority messages and, (2) remote retrieval of messages. E-mail server 110 serves as a repository for e-mail messages received over a network such as the Internet 130. In the absence of any enhanced messaging services, an e-mail subscriber would typically retrieve e-mail messages from e-mail server 110 using e-mail client software through the initiation of dial-up access or using a dedicated Internet connection. The enhanced messaging functions provided by the system depicted in FIG. 1 include automatically alerting a message recipient of the receipt of new messages, filtering low-priority messages as well as providing for remote message retrieval. The notification and remote retrieval aspects of the present invention are designed to work in conjunction with one another but also may be used independently and may be combined with other messaging system architectures.

According to one embodiment of the present invention, messaging system server 120 performs and controls the functionality of the enhanced messaging services. Although the embodiment depicted herein incorporates a remote e-mail server 110, an alternative embodiment of the invention provides for the integration of e-mail server 110 and messaging system server 120.

According to one embodiment, messaging system server 120 comprises CPU 124, permanent storage device 122 and memory 126. In one example, CPU 124 may be an application specific integrated circuit (ASIC) specifically designed to perform the functions delineated herein. If the functionality of messaging system server 120 and e-mail server 110 are integrated, CPU 124 may handle message server functionality and enhanced message system services as separate processes. According to one embodiment of the present invention, messaging system server 120 is connected to an network such as Internet 130 through which messaging system server 120 has access to remote message server 110, which receives and stores messages of a message recipient.

According to one embodiment of the present invention, messaging system server 120 provides notification to an enhanced messaging subscriber of high priority e-mail messages by transmitting a wireless message to a wireless device 170 carried by the subscriber. According to this embodiment, upon the detection of new messages, messaging system server 120 transmits wireless electromagnetic signals through transceiver 150, antenna 160a and wireless subnet 180 to wireless device 170. According to one embodiment, wireless device 170 is a pager device that can receive alphanumeric data over a wireless interface, although in alternative embodiments wireless device 170 may be a cellular telephone, PCS device or any other wireless communication device equipped with transceiver 150 and antenna 160b. Although the embodiment described herein shows the wireless transmission apparatus as integrated with messaging system server 120, in alternative embodiments, messaging system server 120 may initiate a wireless page by dialing a paging system using a conventional PSTN (Public Switched Telephone Network) call.

In general, the present invention may be implemented using any type of devices capable of receiving a message code either as alphanumeric information or some other medium, wired or wireless. For example, wireless device 170 could be replaced with a personal computer connected to messaging system server 120 over an Internet 130 connection vie wire or wireless transmission paths. Moreover, wireless device 170 could be replaced with a standard telephone device in which case messaging system server 120 could deliver message code using a text to speech (TTS) device over the PSTN.

In order to provide an enhanced messaging system service subscriber with the capability of retrieving messages from a remote location, messaging system server 120 is also connected with user interface 140 through which remote access device 190 can communicate with messaging system server 120. User interface 140 may be an IVR (interactive voice response) system in the case where access device 190 is a telephone. Or, user interface 140 may be an HTTP (hypertext transport protocol) server in the case where access device 190 is a computer device such as a personal computer (PC). In the latter case, typically PC 190 would be equipped with browser software to display HTML (Hypertext Markup Language) pages.

Figure 2:
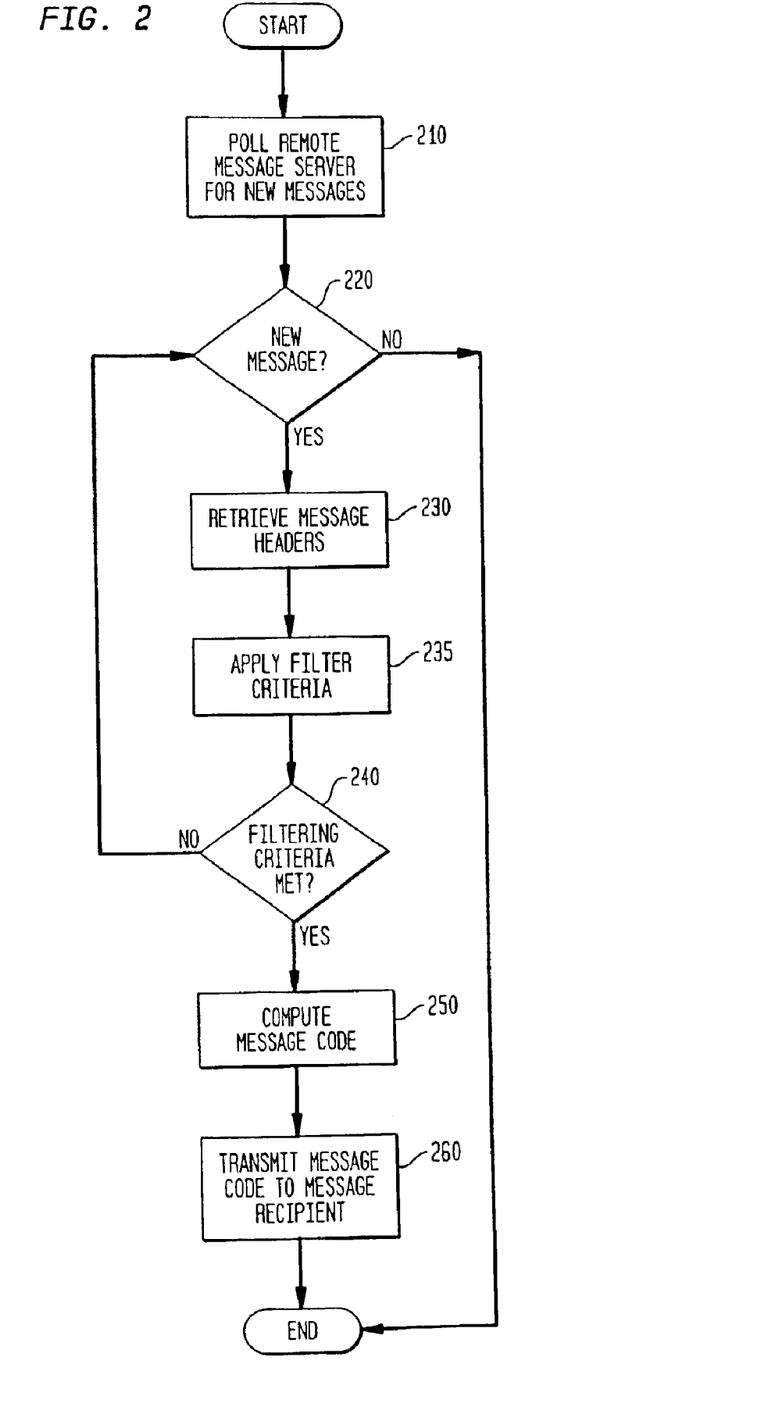
FIG. 2 is a flowchart of steps for alerting a user of a high-priority message according to one embodiment of the present invention.

FIG. 2 is a flowchart depicting the steps of alerting a subscriber to the receipt of new e-mail according to one embodiment of the present invention. In one embodiment this procedure is implemented as a separate process running on messaging system server 120. According to this embodiment, messaging system server 120 periodically polls remote e-mail server 110 for new messages.

Messaging system server 120 and e-mail server 110 communicate using a protocol for the retrieval of messages, according to one embodiment, for example POP 3 (Post Office Protocol Version 3), documented in RFC (Request for Comments) 1225. The POP 3 protocol is intended to permit a workstation to dynamically access a maildrop on a server host in a useful fashion. In particular, the POP3 protocol is used to allow a workstation to retrieve mail that the server is holding for it. The present invention is also compatible and may be implemented using any protocol for the retrieval of e-mail messages such as IMAP (Interactive Mail Access Protocol). Thus, the discussion of POP3 in the embodiments described herein is not intended to limit the scope of the invention.

In step 210, messaging system server 120 polls e-mail server 110 for new messages using the POP3 protocol. According to one embodiment, messaging system server is programmed to poll e-mail server 110 on a periodic basis, for example every 15 minutes for the receipt of new messages. If no new messages are detected, the procedure ends ('no' branch of step 220). If a new message has been received ('yes' branch of step 220), a sufficient portion of the message is retrieved to generate a unique message code using a defined hashing function and to apply the filter criteria (step 235) selected by the message recipient. For example, according to one embodiment, if messaging system server 120 detects that a new message has been received at remote message server 110, it issues the appropriate POP3 commands only to retrieve the "Date" and "From" fields of that message. In step 235, filter criteria are applied to the retrieved message headers to determine whether the message recipient should be alerted to the receipt of the message. If a given message does not satisfy the filter criteria ('no' branch of step 240), messaging system server 120 checks for any remaining messages ('no' branch of step 240). If the filter criteria are met ('yes' branch of step 240), a message code is computed using a hashing function applied to the retrieved message headers (step 250) (details described below). Finally, the message code is transmitted to the recipient (step 260). As discussed earlier, this alerting process may be accomplished using a wireless communications interface through transceiver 150a, wireless subnet 180 antenna 160b to wireless device 170 retained by the message recipient.

Figure 3:
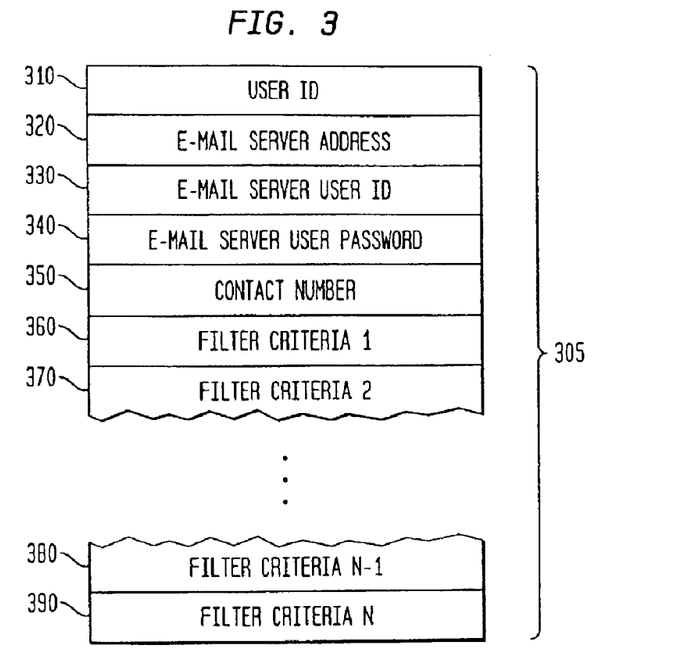
FIG. 3 depicts a data structure for storage of subscriber information according to one embodiment of the present invention.

According to one embodiment of the present invention, to poll remote e-mail server 110 for new e-mail messages, messaging system server 120 maintains a database of information regarding each enhanced message service subscriber. Filter criteria may be stored in this database as additional fields or in a separate relational database. In one embodiment, messaging system server 120 stores a database of records 305, one for each subscriber, using the structure as depicted in FIG. 3. According to this embodiment, each database record 305 contains a user identifier 310, the address of the subscriber's POP3 e-mail server 320, a subscriber's login ID in order to access a POP3 mail server associated with the subscriber 330, a login password to access a POP3 mail server associated with the subscriber 340, a contact number (e.g., a pager number) and a set of filter criteria associated with each subscriber 360–390.

According to one embodiment, each field in data record 305 stores information in a fixed length field using an ASCII (American Standard Code for Information Interchange) representation. In one embodiment, each filter criteria field, 360–390, corresponds to a different field of an e-mail message, such as the sender, date, message subject, etc. Messages may be filtered using any criteria contained in the message itself. For example, filtering may be effected based on the date, time, subject matter or sender of the message, etc. For example, an enhanced messaging services subscriber might desire only to be alerted about e-mail from a particular party, such as a personal contact or family member. In another case, a subscriber might want to be alerted to messages containing certain key words or phrases in the body of the e-mail. According to one embodiment of the present invention, the filter criteria may contain wildcard characters for selecting a range of matching incoming e-mail messages. For example, storing the code "Jo??" in the filter criteria field corresponding to the name of the sender would select all incoming e-mail messages from senders with four character names beginning with "Jo."

Figure 4:
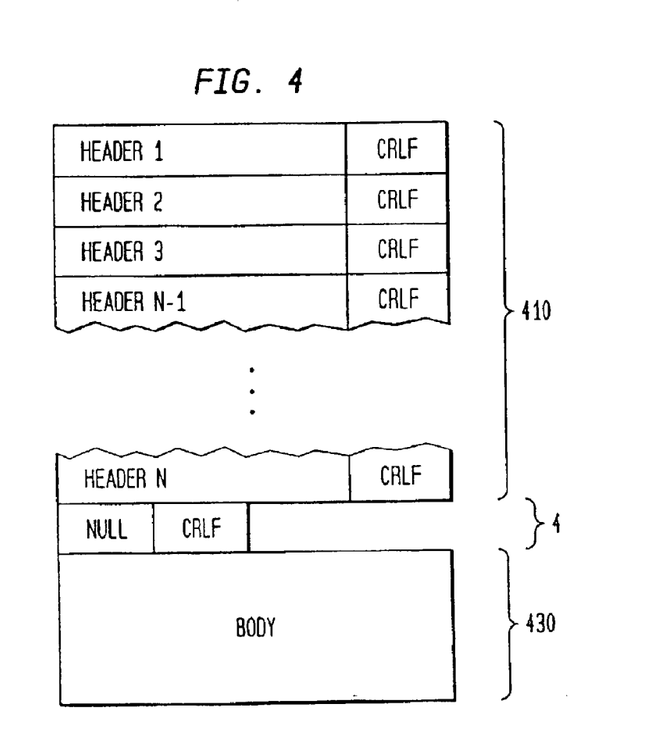
FIG. 4 depicts a message storage format according to one embodiment of the present invention.

FIG. 4 depicts the format in which a message is stored on e-mail server 110 according to one embodiment of the present invention. According to this embodiment, messages are stored using the RFC 822 format, which is prior art. According to RFC 822 format the header is separated from the body by the four characters CR (carriage return), LF (line feed) LF, CR, LF.

In order to alert a user to the receipt of a new message, a unique code signature must be generated so that the user can retrieve the message from a remote location. A suitable hashing function is chosen to map a particular message to a unique identifying code. The paramount criteria in choosing a hashing function is its ability, given a domain, to uniformly distribute its output in a numerical interval. According to one embodiment of the present invention, a code signature or checksum is generated using a hashing function, which takes as its arguments the Date and From header fields of a message. For example, in one embodiment, the following C code is used to generate a unique code signature from the "Date" and "From" fields of an RFC 822 format message.

```
int chksum (header *palert)
{
unsigned int uid, crunch;
char *p, *ret;
char month_names[] = "Jan Feb Mar Apr May
Jun Jul Aug Sep Oct Nov Dec";
month_no=(strstr(month_names, palert->pdate->month) -
month_names) /4;
uid = palert->pdate->minute + palert->pdate->hour * 60 +
palert->pdate->day * 60 *24 +
month_no * 60 * 24 *31 + (palert->pdate->year-1900) * 60
* 24 * 31 * 12;
for (crunch=0, p =palert->from; p && *p; p++) crunch ^=*p;
uid +=crunch <<26;
ret=malloc(25);
sprintf(ret, "%u", uid);
return ret;
} /* end of mk_uid( ) */
```

A second aspect of the present invention pertains to the remote retrieval of messages. In the embodiments described herein, remote retrieval is effected using a standard telephone, which can produce DTMF (Dual Tone Multi-Frequency) codes, thereby acting as access device 190 over the PSTN. According to this embodiment, user interface 140 contains IVR 145 through which the subscriber can transmit a previously received code signature from a standard telephone device that produces DTMF codes. IVR 145 accepts DTMF signals generated by a touch-tone telephone as input and provides voice output to the user. Thus, IVR subsystem 145 permits an enhanced messaging system subscriber to use a standard telephone to input a code signature and perform other functions directed to messaging system server 120. For example, in one embodiment, IVR system 145 provides access to messaging system server 120 through a series of voice command prompts or a voice menu structure. The user provides input to the IVR 145 by pressing keys on access device 190. In addition, according to one embodiment, user interface 140 contains a text-to-speech processor 147, which takes as input an ASCII text stream and outputs synthesized audio speech corresponding to this text. The function of text-to-speech processor 147 is to provide a speech output of e-mail messages retrieved using a code signature so that a subscriber can retrieve e-mail using a standard telephone device.

Figure 5:
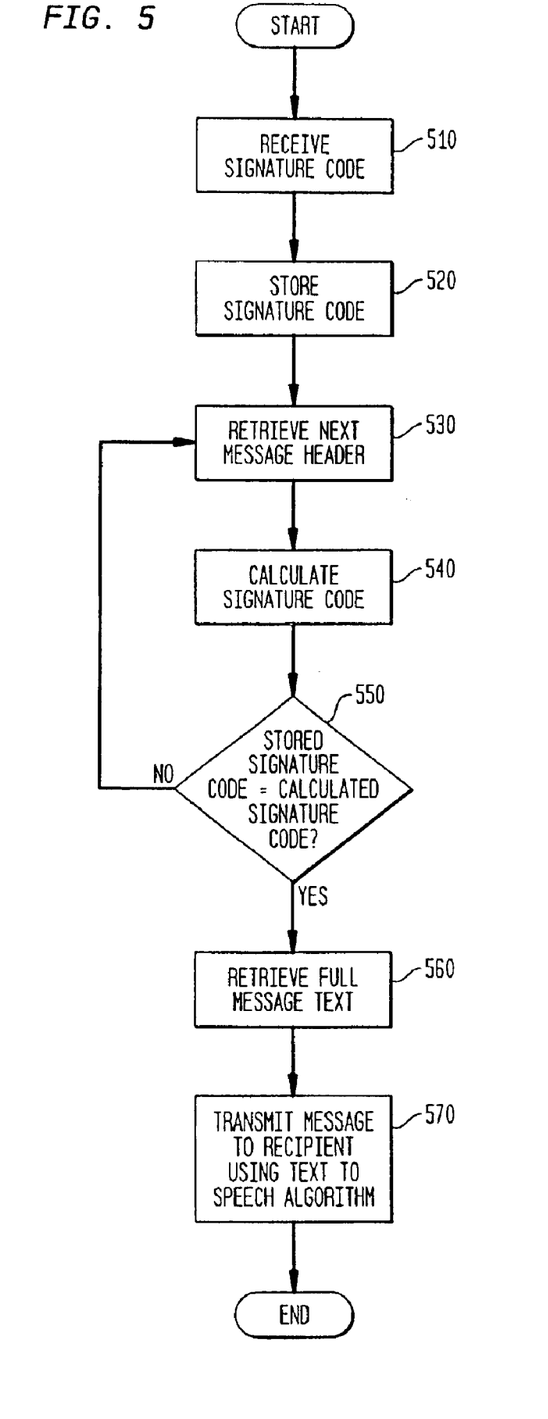
FIG. 5 is a flowchart of steps for the retrieval of a message according to one embodiment of the present invention.

FIG. 5 is a flowchart depicting a mechanism for the retrieval of a particular message corresponding to a code signature according to one embodiment of the present invention. In step 510, a code signature is received at messaging system server 120 from a subscriber, e.g., via IVR 145 and user interface 140. In step 520 the received signature code is stored in a memory 126. In step 530, messaging system server retrieves a message header of any unread e-mail messages residing on remote e-mail server 110. In step 540, a signature code is generated based upon the message header retrieved in step 530. This signature code is generated utilizing the same hashing function used for the computation of a message code in step 250. In step 550 the stored signature code (step 520) received from the user is compared with the message code calculated in step 540. If the message codes do not match ('no' branch of step 550), the next message header is retrieved (step 530). Otherwise ('yes' branch of step 550), the full message is retrieved (step 550). This message is then transmitted to the message recipient using a text to speech conversion algorithm. The use of IVR 145 and telephone access device 190 is merely illustrative and is not intended to limit the scope of the claims appended hereto. In fact, user interface 140 could be implemented using a variety of devices such as a web browser interface. In this case access device 190 would be personal computer 190 running web browser 140 and connected to messaging system server 120 via a TCP/IP connection. However, the present invention is compatible and may be implemented with a myriad of alternative access devices 190 and user interfaces 140 for the retrieval of messages based upon a code signature.

Figure 6:
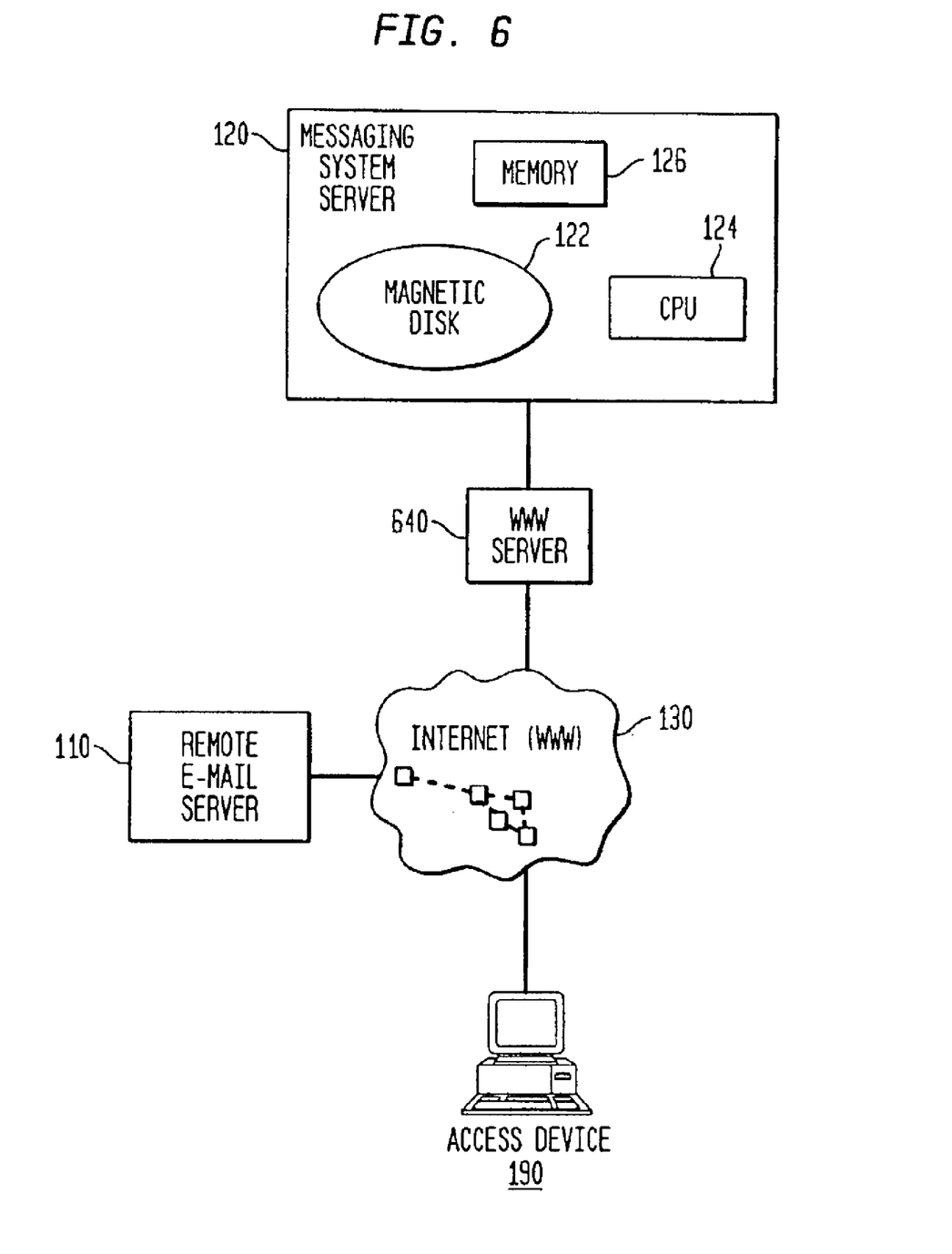
FIG. 6 is a block diagram depicting an alternative system architecture for providing enhanced messaging services according to one embodiment of the present invention.

FIG. 6 depicts one possible alternative embodiment. In this embodiment, access device 190 is a personal computer connected to the Internet. According to this embodiment, personal computer also serves the notification function of wireless device in FIG. 1. According to this embodiment, messaging system server 120 notifies a subscriber connected to the Internet 130 of a high priority message using instant paging software. For example, in one embodiment, upon connecting to the Internet 130, a software program running on personal computer 190 alerts messaging system server 120 through Internet 130 connection of its dynamically assigned IP address. According to this embodiment, the software program running on personal computer 190 continually monitors incoming IP packets sent to it from messaging system server 120. According to this alternative embodiment, messaging system server runs a message notification process as depicted in FIG. 2. However, instead of sending a wireless paging message containing the signature code of a high priority message, according to this embodiment, messaging system server transmits an IP page to personal computer 190 containing the code signature of a high priority e-mail message received at remote e-mail server 110.

Likewise, according to one embodiment, personal computer 190 provides a mechanism for the retrieval of a message corresponding to a previously received message code. According to this alternative embodiment, a subscriber connects to a web site associated with messaging system server 120. For example, messaging system server 120 may be connected to a World-Wide-Web server 640 serving HTML pages. According to this embodiment, web server 640 contains at least one HTML page allowing an enhanced messaging subscriber to input an enhanced messaging system password and user ID along with the code signature of a desired message for retrieval. According to this embodiment, web server 640 then runs a CGI (Common Gateway Interface) script to return the text of the desired message to be displayed on the browser software running on personal computer 160.

The present invention provides a method and system to generate a unique code for a message and then allows easy and direct access to the content of that specific message. The unique code is transmitted in a message alert, which may be implemented for a variety of media. The present invention is highly flexible and can be designed to work with any type of electronic message including e-mail, voice mail, facsimile etc. Furthermore, the enhanced messaging services are transparent to the typical messaging services in use today so that subscribers are not required to change messaging services or learn a new system.

What is claimed is:

1. A method for operating a messaging system comprising:

filtering messages addressed to a message recipient, said filtering being based upon at least one filter criterion previously received from said message recipient, said at least one filter criterion being indicative of messages that said message recipient wishes to be alerted to;

generating a code signature corresponding to a particular message meeting said at least one filter criterion;

transmitting said code signature to said message recipient;

receiving said code signature during a communication session initiated thereafter by said message recipient;

retrieving the message corresponding to the received code signature; and transmitting the retrieved message to said message recipient during said communication session;

wherein said retrieving comprises sequentially searching a directory of said messages addressed to said message recipient messages until a message is found with hashing function output matching said received code signature.

2. A method for operating a messaging system comprising:

filtering messages addressed to a message recipient, said filtering being based upon at least one filter criterion previously received from said message recipient, said at least one filter criterion being indicative of messages that said message recipient wishes to be alerted to;

generating a code signature corresponding to a particular message meeting said at least one filter criterion;

transmitting said code signature to said message recipient;

receiving said code signature during a communication session initiated thereafter by said message recipient;

retrieving the message corresponding to the received code signature;

transmitting the retrieved message to said message recipient during said communication session; and periodically accessing a mailbox in which said messages addressed to said message recipient are stored and performing said filtering for each message in said mailbox.

3. The invention of claim 2 wherein said mailbox is maintained on a message server that said messaging system accesses over a communication network.

4. A method for operating a messaging system comprising:

filtering messages addressed to a message recipient, said filtering being based upon at least one filter criterion previously received from said message recipient, said at least one filter criterion being indicative of messages that said message recipient wishes to be alerted to;

generating a code signature corresponding to a particular message meeting said at least one filter criterion;

transmitting said code signature to said message recipient;

receiving said code signature during a communication session initiated thereafter by said message recipient;

retrieving the message corresponding to the received code signature; and transmitting the retrieved message to said message recipient during said communication session;

wherein said retrieving is carried out independent of the receipt of a login or of a password during said communication session initiated by said message recipient.

5. A message system apparatus comprising a computer system adapted to:

filter messages addressed to a message recipient based upon at least one filter criterion previously specified by said message recipient, said at least one filter criterion being indicative of messages that said message recipient wishes to be alerted to;

generate a different code signature for each message meeting said at least one filter criterion;

transmit each generated code signature to said message recipient;

receive previously transmitted code signatures during respective communication sessions initiated by said message recipient;

retrieve the particular messages that correspond to said received code signatures; and transmit each said retrieved message to said message recipient during the respective communication session;

wherein said code signatures are generated by applying a hashing function to at least a portion of the corresponding messages;

and wherein said computer system is further adapted to retrieve said particular messages by searching stored messages addressed to said message recipient until a message is found with hashing function output matching previously transmitted code signatures.

6. A message system apparatus comprising a computer system adapted to:

filter messages addressed to a message recipient based upon at least one filter criterion previously specified by said message recipient, said at least one filter criterion being indicative of messages that said message recipient wishes to be alerted to;

generate a different code signature for each message meeting said at least one filter criterion;

transmit each generated code signature to said message recipient;

receive previously transmitted code signatures during respective communication sessions initiated by said message recipient;

retrieve the particular messages that correspond to said received code signature; and transmit each said retrieved message to said message recipient during the respective communication session;

wherein said computer system is further adapted to periodically access a mailbox into which have been stored said filtered messages addressed to said message recipient.

7. The invention of claim 6 wherein said mailbox is maintained on a message server that said computer system accesses over a communication network.

8. A message system apparatus comprising a computer system adapted to:

filter messages addressed to a message recipient based upon at least one filter criterion previously specified by said message recipient, said at least one filter criterion being indicative of messages that said message recipient wishes to be altered to;

generate a different code signature for each message meeting said at least one filter criterion;

transmit each generated code signature to said message recipient;

receive previously transmitted code signatures during respective communication sessions initiated by said message recipient;

retrieve the particular messages that correspond to said received code signatures; and transmit each said retrieved message to said message recipient during the respective communication session;

wherein said computer system is further adapted to retrieve said particular messages without having received either a login or a password during said communication sessions initiated by said message recipient.

9. A method performed by a message recipient comprising providing to a messaging system at least one filter criterion indicative of messages that said message recipient wishes to be alerted to;

receiving from said messaging system a code signature for a message meeting said at least one filter criterion;

initiating a communication session with said messaging system;

transmitting said code signature to said messaging system during said communication session; and receiving said message from said messaging system during said communication session;

wherein said message recipient receives said message independent of having entered a login or a password during said communication session.

* * * * *